US005747710A

United States Patent [19]

Carmichael

[11] Patent Number: 5,747,710

[45] Date of Patent: May 5, 1998

[54] PULSE SENSOR CLIP

[76] Inventor: Edward Carmichael, 4373 Sequoyah Rd., Oakland, Calif. 94605

[21] Appl. No.: 767,476

[22] Filed: Dec. 16, 1996

[51] Int. Cl.[6] .......... G01D 21/00

[52] U.S. Cl. .......... 73/866.5; 324/76.39; 324/126

[58] Field of Search .......... 73/866.5; 248/56; 324/126, 76.39; 70/866.5

[56] References Cited

U.S. PATENT DOCUMENTS

| | | | |
|---|---|---|---|
| 2,408,045 | 9/1946 | Cottrell | 173/340 |
| 3,582,770 | 6/1971 | Hammond | 324/34 |
| 3,828,246 | 8/1974 | Maynard | 324/18 |
| 3,889,625 | 6/1975 | Roller et al. | 115/18 E |
| 3,975,735 | 8/1976 | McCullough et al. | 324/67 |
| 4,683,747 | 8/1987 | Hall | 73/119 R |
| 4,706,016 | 11/1987 | Schweitzer, Jr. | 324/102 |

OTHER PUBLICATIONS

Autonnic Research International brochure for ARM-126 Engine Hour Log. 2 pages.

*Primary Examiner*—Hezron E. Williams
*Assistant Examiner*—Nashmiya Fayyaz
*Attorney, Agent, or Firm*—Jack Lo

[57] ABSTRACT

A pulse sensor clip includes a body member composed of a conductive plastic. The body member includes a pair of parallel ears defining a keyhole-shaped channel therebetween for clipping onto an ignition cable. The distal end of a sensor cable extending from an engine time log is coated with a conductive adhesive, and inserted into a cable-mounting hole on the body member. A pin hole intersecting the cable-mounting hole extends between the cable-mounting hole and an exterior surface of the body member. A retaining pin is positioned in the pin hole, and driven into the sensor cable to secure it. A security wire lock can be installed through a pair of security holes on the ears to resist unauthorized removal of the sensor clip from the ignition cable.

11 Claims, 1 Drawing Sheet

PULSE SENSOR CLIP

STATEMENT REGARDING FEDERALLY SPONSORED REASERACH OR DEVELOPMENT

Not applicable.

CROSS REFERENCE TO RELATED APPLICATIONS

Not applicable.

BACKGROUND OF THE INVENTION

1. Field Of The Invention:

This invention relates generally to engine sensors, specifically to a sensor clip for sensing electrical pulses in a cable.

2. Prior Art:

An engine time log is a device for monitoring the total running time of a spark ignition, internal combustion engine. Autonnic Research International of Hayward, Calif., produces such a device with the model number "ARM-126." It includes a small housing with a metal tab for mounting to a grounded portion of an engine or engine compartment, a sensor cable extending from the housing, and a pulse sensor clip attached to the distal end of the sensor cable. The sensor clip, which is made of a conductive plastic, clips onto an ignition cable of the engine for capacitively detecting the high voltage pulses carried therein. The signal is translated by the electronics in the housing into a measure of engine operating time.

The sensor cable is attached to the sensor clip by stripping a short length of insulation from its distal end, folding back the strands of copper, spreading them evenly around the circumference of the remaining insulation, and securing it in a hole on the sensor with conductive adhesive. The process is laborious, and the sensor cable tends to detach from the sensor clip during rough handling.

OBJECTS OF THE INVENTION

Accordingly an object of the present invention is to provide a pulse sensor clip that is easily attached to a sensor cable.

Another object of the present invention is to provide a pulse sensor clip that is securely attached to the sensor cable to withstand rough handling. Yet another object of the present invention is to provide a pulse sensor clip that resists unauthorized removal from the ignition cable on which it is installed.

Further objects of the present invention will become apparent from a consideration of the drawings and ensuing description.

BRIEF SUMMARY OF THE INVENTION

A pulse sensor clip includes a body member with a keyhole-shaped channel for clipping onto an ignition cable of a combustion engine. A contiguous, cable-mounting hole extends partially into the body member. A pin hole extends orthogonally from the cable-mounting hole to an exterior surface of the body member. A retaining pin is positioned within the pin hole. The sensor clip is attached to a sensor cable by coating the end of the sensor cable with conductive adhesive, inserting the sensor cable in the cable-mounting hole, and driving the retaining pin into the sensor cable. A pair of security holes extend through the sides of the keyhole-shaped channel, so that a security wire lock can be installed to secure the clip on the ignition cable.

DRAWING REFERENCE NUMERALS

| | |
|---|---|
| 10. Pulse Sensor Clip | 11. Sensor Cable |
| 12. Engine Time Log | 13. Body Member |
| 14. Ear | 15. Ear |
| 16. Keyhole-Shaped Channel | 17. Circular Portion |
| 18. Neck Portion | 19. Security Hole |
| 20. Security Hole | 21. Cable-Mounting Hole |
| 22. Pin Hole | 23. Retaining Pin |
| 24. Conductive Adhesive | 25. Conductor |
| 26. Ignition Cable | 27. Security Lock |
| 28. Wire | |

DETAILED DESCRIPTION OF THE INVENTION

Figure 1:
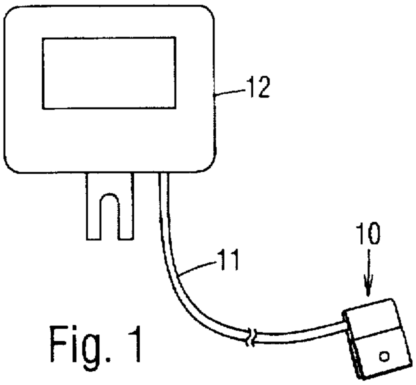
FIG. 1 is a front view of a pulse sensor clip connected to an engine time log housing.

FIG. 1:

In accordance with a preferred embodiment of the invention shown in the front view of FIG. 1, a pulse sensor clip 10 is connected by a sensor cable 11 to a conventional engine time log housing 12, such as model "ARM-126" sold by Autonnic Research International of Hayward, Calif.

Figure 2:
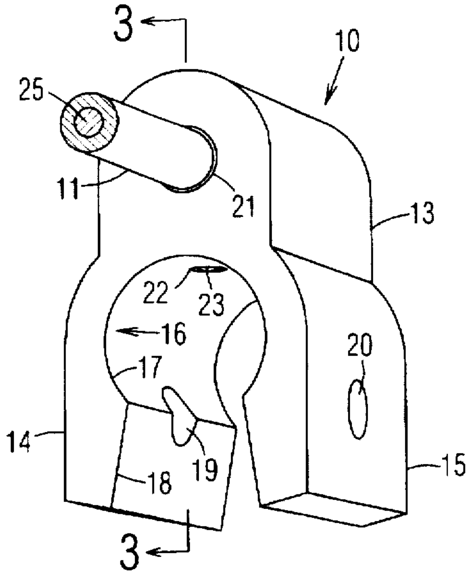
FIG. 2 is an end perspective view of the pulse sensor clip.
Figure 3:
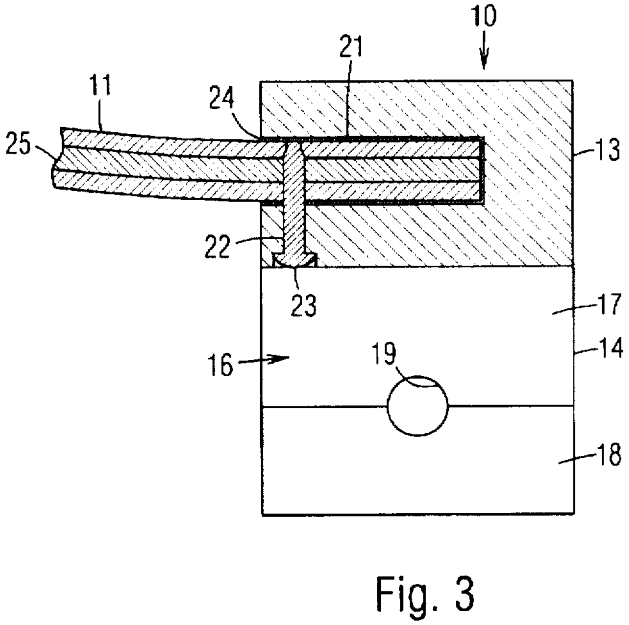
FIG. 3 is a side sectional view of the pulse sensor clip, taken along line 3 -3 in FIG. 2.

FIGS. 2 and 3:

Sensor clip 10 is shown in an end perspective view in FIG. 2 and a sectional view in FIG. 3. It includes a body member 13 with a pair of generally parallel ears 14 and 15 that form a keyhole-shaped channel 16 therebetween. The closed inner end of channel 16 is a circular portion 17, and the open outer end is a narrower neck portion 18, which is outwardly diverging. Security holes 19 and 20 extend through ears 14 and 15, respectively, at a position between circular portion 17 and neck portion 18. A cable-mounting hole 21 extends partially into body member 13, parallel to channel 16. A pin hole 22 extends orthogonally between cable-mounting hole 21 and an exterior surface of body member 13, which in this example is the inner end of channel 16. A metal retaining pin 23 is positioned in pin hole 22.

Sensor cable 11 is attached to sensor clip 10 by coating its distal end with a conductive adhesive 24, inserting it fully into hole 21, and driving pin 23 into sensor cable 11 until the outer end of pin 23 is flush with the surface of body member 13. The end of sensor cable 11 is simply cut blunt; stripping is not required. Pin 23 thus secures sensor cable 11 on body member 13 to prevent inadvertent detachment, even during rough handling. Pin 23 also provides a direct conductive path between a conductor 25 in sensor cable 11 and body member 13, which is preferably made of an electrically conductive plastic filled with carbon fiber or stainless steel strands.

Figure 4:
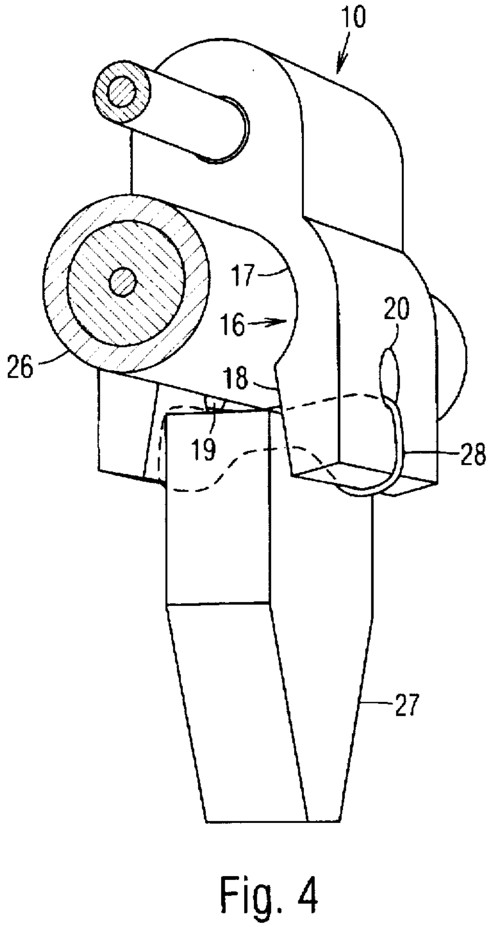
FIG. 4 is an end perspective view of the pulse sensor clip installed on an ignition cable.

FIG. 4:

As shown in FIG. 4, sensor clip 10 is attached to an ignition cable 26 by clipping channel 16 around it until it is seated within circular portion 17. Diverging neck portion 18 facilitates the entry of ignition cable 26. Circular portion 17 is sized to snugly fit an ignition cable of a particular diameter. A conventional security wire lock 27, such as one sold by ELC Security of San Diego, Calif., is installed by inserting a wire 28 through security hole 19, under ignition cable 26, through security hole 20, and crimping lock 27. Sensor clip 10 is thus locked onto ignition cable 26 to resist unauthorized removal.

SUMMARY AND SCOPE

Accordingly, I have provided a pulse sensor clip that is easily attached to a sensor cable. It is attached to the sensor cable securely enough to resist detachment even during rough handling. It can be securely clipped onto an ignition cable, and it can be locked to resist unauthorized removal from the ignition cable.

Although the above descriptions are specific, they should not be considered as limitations on the scope of the invention, but only as examples of the embodiments. Many substitutes and variations are possible within the teachings of the invention. For example, the diameter of circular portion 17 can be changed to fit ignition cables of different sizes. Instead of the inner end of channel 16, pin 23 can extend into body member 11 from another side thereof. Other locking devices can be used. Sensor clip 10 may be used with other types of engine time logs. Aside from an engine time log, sensor clip 10 can be connected to other types of instruments, and it can be used for sensing electrical pulses in other types of cables and electrical devices. Therefore, the scope of the invention should be determined by the appended claims and their legal equivalents, not by the examples given.

I claim:

1. A pulse sensor device, comprising: an electrically conductive body member; a cable-mounting hole extending into said body member; a pin hole intersecting said cable-mounting hole, said pin hole extending between said cable-mounting hole and an exterior surface of said body member; an electrical sensor cable having one end positioned in said cable-mounting hole, said cable including a conductor surrounded by an insulator; and a retaining pin positioned in said pin hole, said retaining pin being driven into said conductor through said insulator of said sensor cable so as to retain said sensor cable within said cable-mounting hole and to provide a direct conductive path between said conductor and said electrically conductive body member thereby forming a pulse sensor for measuring electrical pulses.

2. The pulse sensor device of claim 1, wherein said retaining pin comprises a metal pin.

3. The pulse sensor device of claim 1, further including a conductive adhesive disposed between said end of said sensor cable and said cable-mounting hole.

4. A pulse sensor clip for clipping onto an electrical cable, comprising: a body member including a pair of parallel ears defining a keyhole-shaped channel therebetween adapted to be clipped onto said electrical cable, said body members forming a pulse sensor for measuring electrical pulses; a cable-mounting hole extending into said body member; a pin hole intersecting said cable-mounting hole, said pin hole extending between said cable-mounting hole and an exterior surface of said body member; a sensor cable having one end positioned in said cable-mounting hole; and a retaining pin positioned in said pin hole, said pin having a smaller diameter than said sensor cable said retaining pin being driven into said sensor cable so as to retain said sensor cable within said cable-mounting hole.

5. The pulse sensor clip of claim 4, wherein said body member is composed of an electrically conductive material.

6. The pulse sensor clip of claim 4, wherein said retaining pin comprises a metal pin.

7. The pulse sensor clip of claim 4, further including a conductive adhesive disposed between said end of said sensor cable and said cable-mounting hole.

8. The pulse sensor clip of claim 4, further including a security hole extending through each of said ears, said security holes being adapted to pass a wire of a security wire lock for locking said electrical cable in said keyhole-shaped channel.

9. A method for assembling a pulse sensor device, comprising:

providing an electrically conductive body member, said body member including a cable-mounting hole extending thereinto, a pin hold intersecting said cable-mounting hole, said pin hole extending between said cable-mounting hold and an exterior surface of said body member;

providing an electrical sensor cable comprising a conductor surrounded by an insulator;

inserting one end of said sensor cable into said cable-mounting hole on said body member;

providing a retaining pin;

inserting said retaining pin into said pin hole from an outer end thereof; and driving said retaining pin into said conductor through said insulator of said sensor cable, so as to provide a direct conductive path between said conductor and said electrically conductive body member thereby forming a pulse sensor for measuring electrical pulses.

10. The method of claim 9, wherein said retaining pin comprises a metal pin.

11. The method of claim 9, further including coating said end of said sensor cable with a conductive adhesive prior to inserting said sensor cable into said cable-mounting hole.

* * * * *